United States Patent [19]
Corry et al.

[11] Patent Number: 5,649,160
[45] Date of Patent: Jul. 15, 1997

[54] NOISE REDUCTION IN INTEGRATED CIRCUITS AND CIRCUIT ASSEMBLIES

[75] Inventors: Alan G. Corry, Santa Clara; Graham Y. Mostyn, Saratoga; Jean-Yves Michel, Santa Clara, all of Calif.

[73] Assignee: MicroUnity Systems Engineering, Inc., Sunnyvale, Calif.

[21] Appl. No.: 447,565

[22] Filed: May 23, 1995

[51] Int. Cl.$^6$ .................................................. G06F 12/00
[52] U.S. Cl. ................................................ 395/494; 395/481
[58] Field of Search .................................. 395/494, 550, 395/481; 341/143; 365/206, 233

[56] References Cited

U.S. PATENT DOCUMENTS

| | | | |
|---|---|---|---|
| 4,566,062 | 1/1986 | Ohnishi et al. | 395/775 |
| 4,746,899 | 5/1988 | Swanson et al. | 341/122 |
| 4,882,712 | 11/1989 | Ohno et al. | 365/206 |
| 4,961,184 | 10/1990 | Owen | 370/76 |
| 5,060,178 | 10/1991 | Kato et al. | 364/600 |
| 5,097,158 | 3/1992 | Michel | 327/178 |
| 5,146,112 | 9/1992 | Ito et al. | 327/566 |
| 5,146,617 | 9/1992 | Moen, Jr. | 455/310 |
| 5,187,687 | 2/1993 | Burckhardt et al. | 367/7 |
| 5,204,982 | 4/1993 | Cooperman | 455/295 |
| 5,268,597 | 12/1993 | Fong | 326/21 |
| 5,278,792 | 1/1994 | Inoue et al. | 365/193 |
| 5,373,293 | 12/1994 | Hirata | 341/118 |
| 5,426,392 | 6/1995 | Kornfeld | 327/551 |

FOREIGN PATENT DOCUMENTS

| | | |
|---|---|---|
| 58-70564 | 4/1983 | Japan. |
| 58-70565 | 4/1983 | Japan. |
| 4-127467 | 4/1992 | Japan. |
| 5-190783 | 7/1993 | Japan. |
| WO 90/14710 | 11/1990 | WIPO. |

OTHER PUBLICATIONS

Patent Abstracts of Japan, vol. 008, No. 185 (E-262), JP, A, 59075729 (Nippon Denki KK) (1984).

International Search Report, PCT/US96/05549, dated Sep. 2, 1996.

Primary Examiner—Tod R. Swann
Assistant Examiner—Conley B. King, Jr.
Attorney, Agent, or Firm—Burns, Doane, Swecker & Mathis L.L.P.

[57] ABSTRACT

The present invention encompasses techniques for reducing digital noise in integrated circuits and circuit assemblies, particularly dense mixed-signal integrated circuits, based upon shaping the noise from the digital circuit and concentrating it in a single, or a small number, of parts of the frequency spectrum. Generally, the presence of noise in the analog circuit is less important at certain frequencies, and therefore the spectral peak or peaks from the digital circuit can be carefully placed to result in little or no interference. As an example, a radio receiver might be designed such that the peaks of the digital noise lie between received channels, outside the band edges of each.

6 Claims, 5 Drawing Sheets

NOISE REDUCTION IN INTEGRATED CIRCUITS AND CIRCUIT ASSEMBLIES

BACKGROUND OF THE INVENTION

1. Field of the Invention

The present invention relates to noise reduction in integrated circuits and circuit assemblies, particularly combination analog and digital (mixed-signal) subsystems and mixed-signal integrated circuit chips.

2. State of the Art

Both analog and digital integrated circuits have been widely used in the electronics industry for many years. Until recently, however, integrated circuits were typically either digital or analog, but not both. Mixed-signal integration, in which analog and digital circuitry is integrated on the same chip, has only recently gained widespread use, responding to the need to find new ways to continue the trend of increasing integration density. Reducing the number of chips in a product simplifies manufacture, reduces cost and increases reliability.

Mixed-signal integration, however, presents considerable problems not present in either analog or digital integrated circuits. Notably, the noise spectrum produced by dense, high-speed digital circuits can easily interfere with high-frequency analog components. Since the waveforms transitions generated by digital circuits are, at least ideally, step transitions having (in accordance with Fourier analysis) a wide noise bandwidth, potential interference of the chip's digital signals with the chip's analog signals poses a distinct threat to circuit performance.

Generally, digital circuits switch quickly between predefined voltage levels, and consequently induce transient disturbances in signal and power lines, as well as energy radiated as electromagnetic waves. Digital circuits themselves are robust in the presence of noise from other sources. By contrast, analog circuits operate at a multiplicity of voltage levels and frequencies, and are sensitive to induced noise. A design challenge therefore becomes ensuring that digital switching noise does not create interference with analog functions.

A digital circuit switching rapidly but regularly, with edges synchronous to a master clock, will generate noise with a strong spectral component at the clock frequency. Additionally, harmonics at odd multiples of the clock frequency will be generated. If the circuit remains synchronous to a master clock, but switches on random clock edges, spectral components above and below the clock frequency will also be generated.

The prior art addresses the issue of preventing noise from reaching analog circuits, or of desensitizing the analog circuits to noise. One measure used to reduce noise interference has been to group analog I/O cells together and to place analog circuitry having critical performance requirements in the vicinity of the analog I/O cells. This solution attempts to, in effect, separate the analog and digital portions of the chip to reduce the proximity of certain analog components to digital components and hence the susceptibility of the analog components to noise from the digital components. In many systems, it is possible to arrange that the analog circuits are operated on a clocked basis, rendering them less sensitive to noise at the clock frequency. Benefits are therefore obtained if the analog circuits are clocked in phase with the digital circuits. Alternatively, the digital clock frequency may be substantially above or below the frequency band in which the analog circuits operate.

The foregoing techniques are often not fully effective, since, as previously described, the digital noise extends well above and below the clock frequency. It is then necessary to resort to potentially costly shielding techniques. Integration of the analog and digital circuits may become infeasible, requiring that they be partitioned into separate chips, with a costly overhead in packaging and connectors. There therefore remains a need for further measures to more effectively reduce digital noise in dense mixed-signal integrated circuits.

SUMMARY OF THE INVENTION

The present invention encompasses techniques for reducing digital noise in integrated circuits and circuit assemblies, particularly dense mixed-signal integrated circuits, based upon shaping the noise from the digital circuit and concentrating it in a single, or a small number, of parts of the frequency spectrum. Generally, the presence of noise in the analog circuit is less important at certain frequencies, and therefore the spectral peak or peaks from the digital circuit can be carefully placed to result in little or no interference. As an example, a radio receiver might be designed such that the peaks of the digital noise lie between received channels, outside the band edges of each.

It is possible to identify those digital circuits producing the greatest amount of switching noise, and if there is a degree of regularity in their activities, the noise spectrum will contain peaks (a "line spectra") as opposed to a continuum. It is not possible to ensure that every digital signal switches entirely regularly, since then the system would not be able to process or transmit any information, other than the fact that it is active. However, while the data bits in such a circuit carrying information must remain statistically random, contributing to wideband noise, it can be arranged that data bit streams, clock signals or strobe signals are either continuous or periodic rather than sporadic. Then noise energy will be concentrated at certain points in the spectrum.

There are many situations where circuit elements are only required to operate at certain times, but there is no impact on functionality if they were to be continuously active, concentrating the noise in narrower spectral bands. For example, a CMOS SRAM produces transients whenever read/write activities are performed. These are created by switching activity of the row and column drivers, and are unaffected by the contents of the memory. It is possible to arrange the SRAM controller design such that read/writes are made on a regular basis, even though there is no new data to be written, or a read is not required. In this case, the noise is concentrated at the read/write frequency; it would otherwise be governed by the sporadic read/write operations and so be distributed randomly.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1:
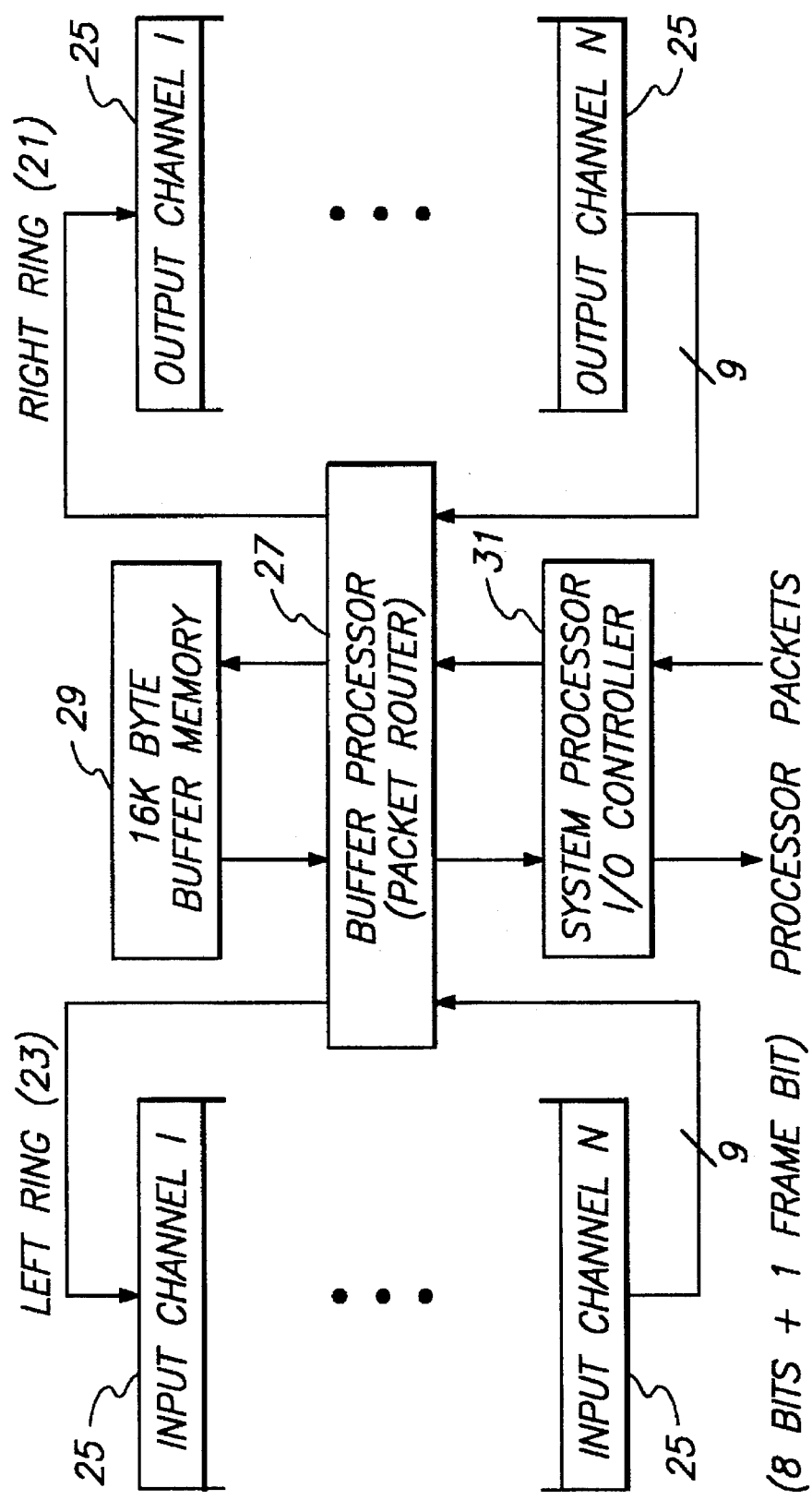
FIG. 1 is a block diagram of a media I/O chip in which an exemplary embodiment of the present invention may be used.

The present invention will be described in the context of a mixed-signal media I/O chip. The more general techniques of the present invention, however, may be applied to mixed-signal circuits of all types, including mixed-signal chips and mixed-signal boards, as well as in other instances in which digital noise is to be reduced.

A media I/O chip may consist of a number of I/O devices which are receiving or transmitting data between memory and the chip's external pins. In a very high-performance technology, the time required to drive a signal from point A to point B can easily be of the order of the cycle time of the system being implemented. On a chip consisting of a large number of I/O devices located all over the chip it is not possible to locate the memory at any one optimal place to eliminate the considerable time penalty it will take to transmit data to and from the memory. To manage the distribution of data to I/O devices without limiting the cycle time of the system being implemented, a suitable transport mechanism is needed.

In addition to the problem of transmission delay, at any one time a subset of I/O devices can simultaneously request use of the memory. It is necessary to provide a mechanism that shares the access to the memory amongst these I/O devices.

On-chip communication between different structures is usually performed by using a bus that connects all the potential transmitters and receivers together. When a transmitter wants to send data to a particular receiver it gains control of the bus and drives its data to all potential receivers (and usually transmitters as well). However, when the cycle time of a chip can be of the order of the time required to drive a tiny segment of such a bus, this traditional approach with its long wires and large number of loads (i.e. current or capacitance added to the transmission link by the presence of a large number of other transmitters or receivers) becomes unacceptable. On-chip communication optimized for high performance systems needs to eliminate the multiple loads and drastically shorten the wire that must be traversed during a clock cycle.

A media I/O chip that addresses both these requirements is described in U.S. patent application Ser. No. 08/447,363 of the present assignee, entitled Memory-Sharing Architecture for Media I/O Chip, incorporated herein by reference. To achieve both these requirements the media I/O chip (or other integrated circuit chip) makes use of two on-chip local area networks that interconnect all I/O devices to a central router. This structure contains a shared memory. The same structure also connects to an external memory interface called the system processor channel which also requires direct access to the memory in addition to all of the I/O devices. A particular arrangement of rings and their communication protocol simplifies access to the shared memory and the I/O devices. The access protocol utilizes excess bandwidth to share a ring amongst competing devices.

Referring now to FIG. 1, to overcome the problems associated with data transmission in a high clock rate system, the media I/O chip utilizes a pipelined point-to-point communication protocol. It allocates I/O devices to two synchronous rings 21 and 23 (called the left ring and the right ring), shown in FIG. 1. All I/O devices 25 are connected to one or other of these two rings. Each ring starts and ends at a buffer processor (or Packet Router) 27 which contains or is connected to a shared memory 29. In a preferred embodiment, the memory 29 is a dual-port, simultaneous read/write memory. Segments of each ring (not shown in FIG. 1) are formed from point-to-point connections between I/O devices. Each device 25 contains a station on the ring which provides a ring input and ring output connection. Each station accepts a packet and passes it from its input to its output after a small number of clocks (potentially altering the packet's contents on the way). Since data transmission during any clock cycle is only point to point, then the propagation delay associated with transmission can be optimized to meet the cycle-time requirements while at the same time maintaining a high-bandwidth transfer capability.

In addition to the rings 21 and 23, an external memory interface 31, the system processor channel, connects to the router 27 and issues memory requests to the router for service. The system processor channel interface 31 also sends requests to internal state registers located in the I/O devices 25.

Each ring 21 and 23 consists of eight uni-directional data wires and a single control wire. Requests on a ring are sent in the form of data packets, which consist of eight bytes of information. These fixed-sized packets continually circulate on a ring, moving from I/O device to I/O device until they reach the router 27, which will service the request contained within the packets. The control wire carries a frame bit which marks the first byte of a packet.

Packets originate from either an I/O device 25 or from the system processor channel controller 31. These two different types of packets are interleaved in time on a ring, with a I/O packet always followed by a system processor packet and vice-versa.

Figure 2:
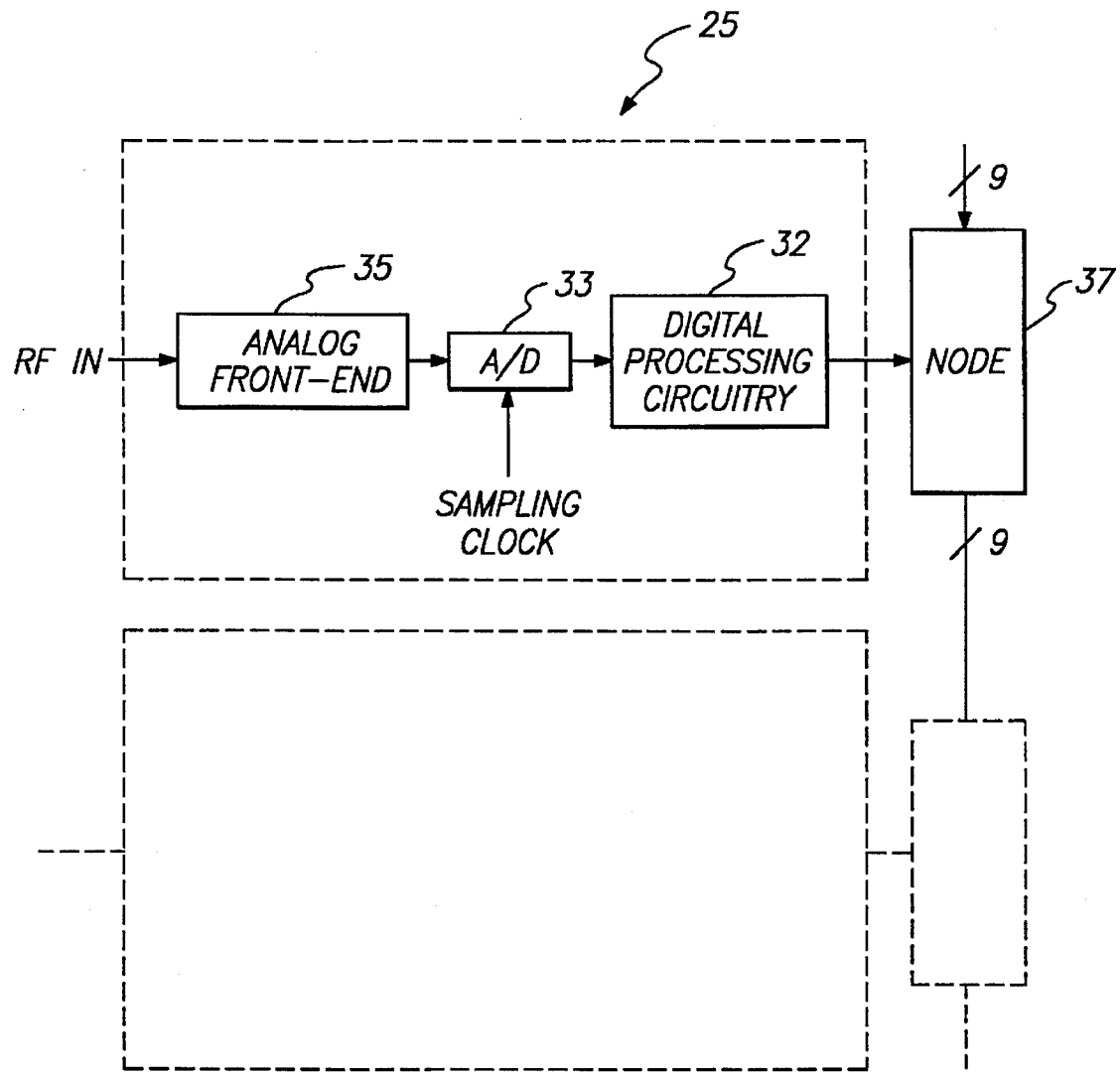
FIG. 2 is a more detailed block diagram of a typical I/O device of FIG. 1.

A ring segment and a typical I/O device are shown in FIG. 2. A digital portion 32 of typical I/O device 25 might receive digital input from an A/D converter 33 used to sample the analog output signal of an RF front-end 35. The digital processing circuitry 32 is connected to one of the right ring 21 and the left ring 23 by a node 37.

The media I/O chip may be designed to receive signals from a broadband media program source. A broadband media program source, for example, might deliver over a hundred video programs, each program occupying a different frequency channel within a predetermined frequency spectrum. In an exemplary embodiment, illustrated in FIG. 3, video channels each having a bandwidth of approximately 6 MHz occupy a spectrum from 54 MHz to just over 1 GHz. The channels are separated by regions in which no energy or only minimal energy is transmitted. Special care must be taken to ensure that no strong noise components are generated that would interfere with reception of a program channel. For example, if a strong noise component were generated at 63 MHz, the noise would prevent proper reception of the program channel located between 60 and 66 MHz. The techniques of the present invention concentrate noise either below the lowest-frequency program channel, above the highest-frequency program channel, or between channels.

Semiconductor memories such as the memory 29 in FIG. 1 present a particularly worrisome source of noise. During a memory transaction, bit lines within the memory are uniformly precharged and subsequently selectively discharged. The bit lines have associated with them some amount of distributed capacitance that may be modelled as lumped capacitors. To achieve high density, memories are usually formed using a CMOS process in which lines are switched over a comparatively wide voltage range between 0 and 3.5 volts (as compared to analog or digital ECL devices that have a voltage swing of only about 250 mV). The combination of the large capacitance of the bit lines and the wide voltage range over which they are switched results in the memory sourcing and sinking a considerable amount of current through a large number of leads. Each of the leads has a distributed inductance associated with it. The change in current flow through the leads therefore produces "ground bounce" and/or "voltage sag," resulting in noise being injected into the power supply network. Measures must be taken to prevent the noise produced by the memory 29 from interfering with the operation of other circuits, particularly the more noise-sensitive analog circuits.

Figure 4:
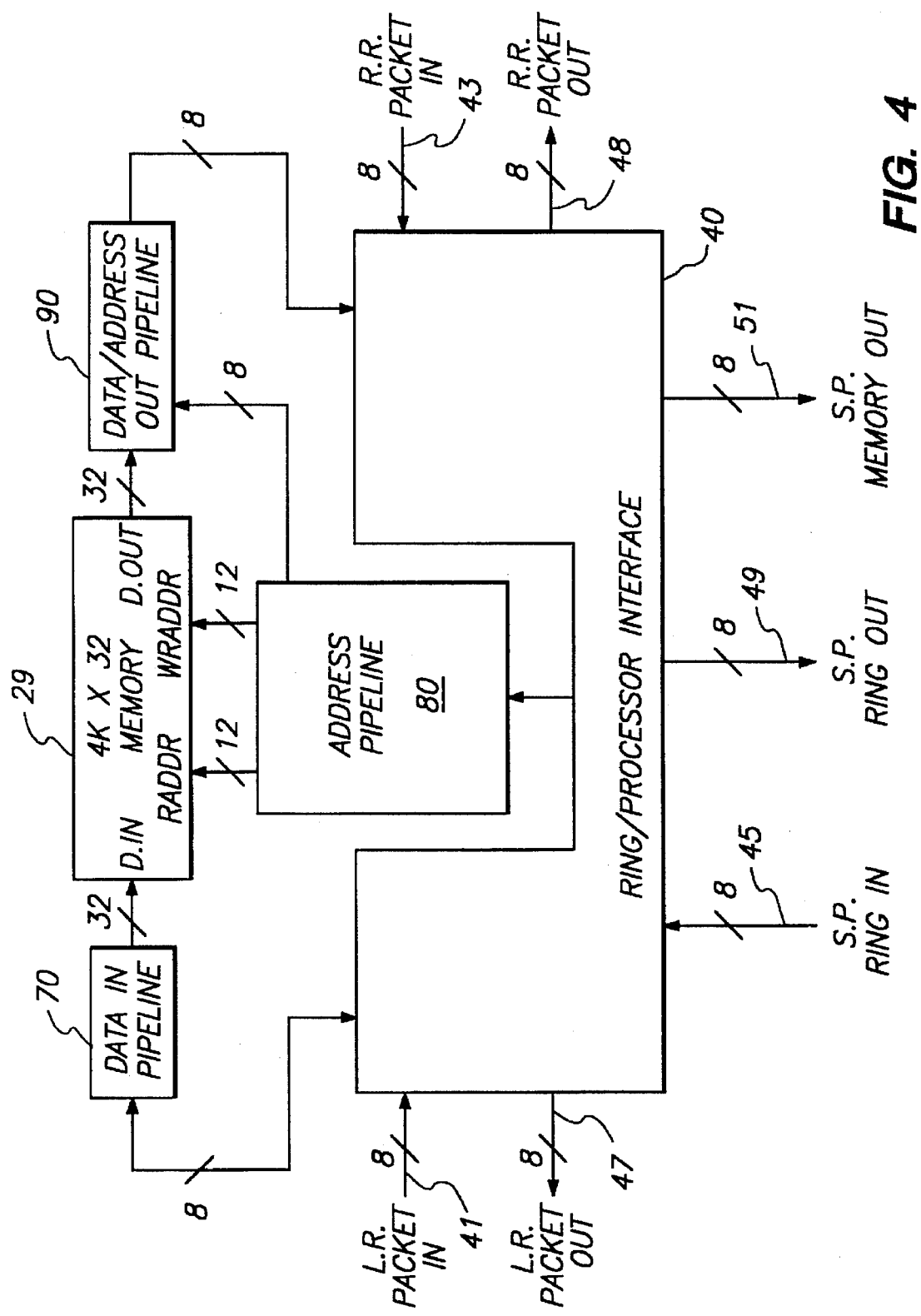
FIG. 4 is a more detailed block diagram of the buffer processor of FIG. 1.

The memory 29 is contained in the Packet Router 27, shown in greater detail in FIG. 4. The Packet Router 27 receives input signals from three eight-bit ring input buses: a Left Ring Packet Input bus 41, a Right Ring Packet Input bus 43, and a System Processor Ring Input bus 45. The Packet Router 27 produces output signals on three corresponding eight-bit ring output buses: a Left Ring Packet Output bus 47, a Right Ring Packet Output bus 48, and a System Processor Ring Output bus 49. In addition, the Packet Router 27 produces output signals on an eight-bit System Processor Memory Output bus 51.

The ring interface portion of the Packet Router 27 enables the right and left rings to communicate with both the memory and the system processor. The memory and the system processor are also placed in communication with both the right and left rings. Multiplexers are used within the ring interface portion of the Packet Router 27 to accomplish intercommunication of the various entities.

Memory interface functions are performed by a memory input data pipeline 70, a memory input address pipeline 80, and a memory output address/data pipeline 90.

The Packet Router 27 controls access to the shared memory 29 and the internal state contained in the I/O devices 25 connected to the rings 21 and 23. The left and right rings are operated 100% out of phase with each other. In other words, looking at the type of packet that is leaving the router for the left and right rings, the packets will be of different types (i.e. when the left ring's packet is a system processor packet then the right ring's will be a I/O packet and vice versa). This feature simplifies the task of sharing the memory, since when requests from the left and right rings enter the router they are still 100% out of phase. The router may therefore route one of the two packets to memory for service while routing the other back to the system processor channel as an I/O channel response.

Similarly, packets from the system processor channel that are bound for the memory are 50% out of phase with the packets originating from the ring (i.e. for packets entering the memory system of the router, the system processor packet's address field overlaps in time the I/O channels data field). Since the first half of a packet is address information the router can generate a stream of memory addresses for the memory by switching between the I/O and the system processor packets every four clocks. In identical fashion a corresponding stream of write data for the memory can be created by switching between the two packet sources every four clocks.

Responses from the memory system can similarly be reconstructed into internal packets by delaying the address stream to account for the access time of the memory. A data stream is created from the data generated by accessing the memory location pointed at by the address stream. The router alternately serves the I/O packets or the system processor packets with four bytes of the control/address/ event information or four bytes of the data stream. The router will send an I/O packet to either the left or right ring as a memory response.

The fixed nature of arrival times of packets at the router allows a simple implementation to be constructed without the need for queues or complex control. It also provides a fixed allocation of memory to the I/O rings and to the system processor interface.

Figure 5:
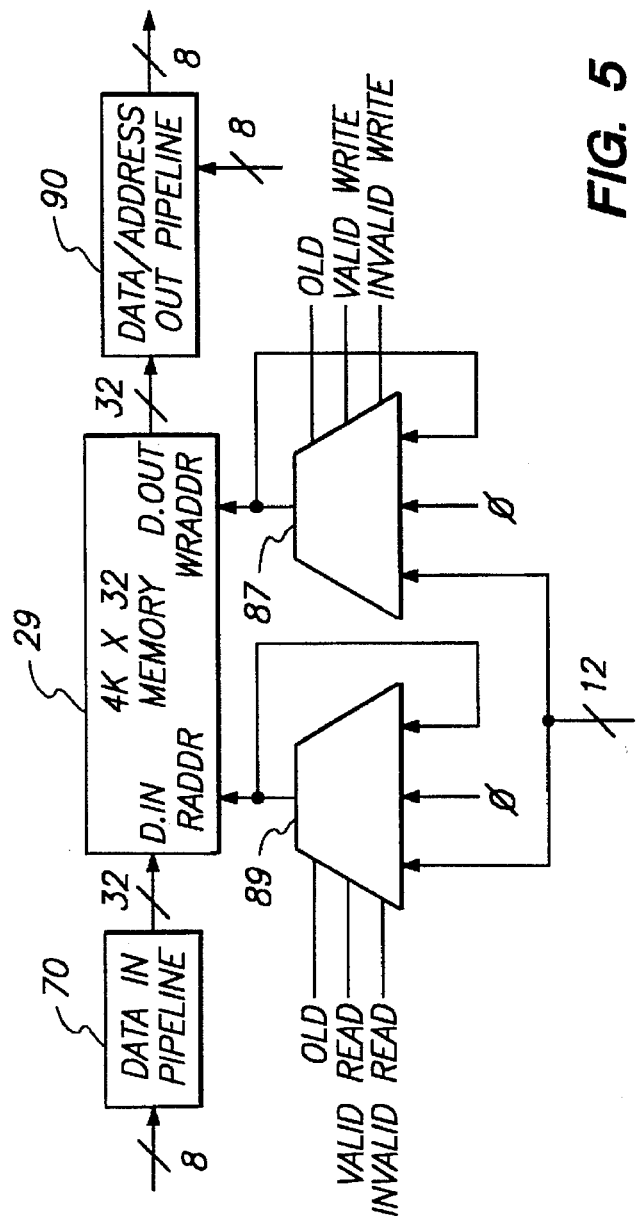
FIG. 5 is a more detailed block diagram of a memory portion of FIG. 4.

FIG. 5 illustrates in greater detail a memory interface portion of the buffer processor of FIG. 4. In particular, the address pipeline 80 of FIG. 4 may be seen to include a write address multiplexer 87 and a read address multiplexer 89.

Each packet contains a R/W control bit designating the packet as pertaining to either a read transaction or a write transaction, and a Valid bit indicating whether or not the packet is valid. Packets are continually circulating in the rings regardless of the level of activity in the system, with idle packets being flagged as invalid.

In dependence on a R/W control bit, one of the multiplexers 87 and 89 selects and applies to either the write-address port of the memory 29 or the read-address port of the memory 29 either an address previously stored in the multiplexer or a new address stored in an address register (not shown). A new address is selected every four clock cycles, while the previous address is selected during the intervening three clock cycles. If the new address, is invalid, however, a "dummy" address is selected, causing a dummy read or a dummy write to be performed. In the illustrated embodiment, address 0 is reserved as a dummy location. When a dummy write to address 0 is performed, therefore, no valid data is overwritten. When a dummy read to address 0 is performed, the data is disregarded by I/O devices because it is recombined in a packet with the original "invalid" tag. In other embodiments, the data stored in the dummy location may have a flag value that identifies it as dummy data. In still further embodiments, the dummy data may be read but not driven on the memory outputs. Using any of the foregoing methods, dummy reads and writes may therefore be prevented from adversely affecting the rest of the data system.

Dummy reads and writes, however, have a pronounced effect in reducing noise produced by the memory. Since a transaction is performed at every opportunity with the memory never being idle, noise is focussed at the transaction frequency and odd harmonics thereof. In a preferred embodiment, this frequency is 432 MHz. If, on the other hand, transactions were performed at random, a much broader noise spectrum would be generated.

Figure 6:
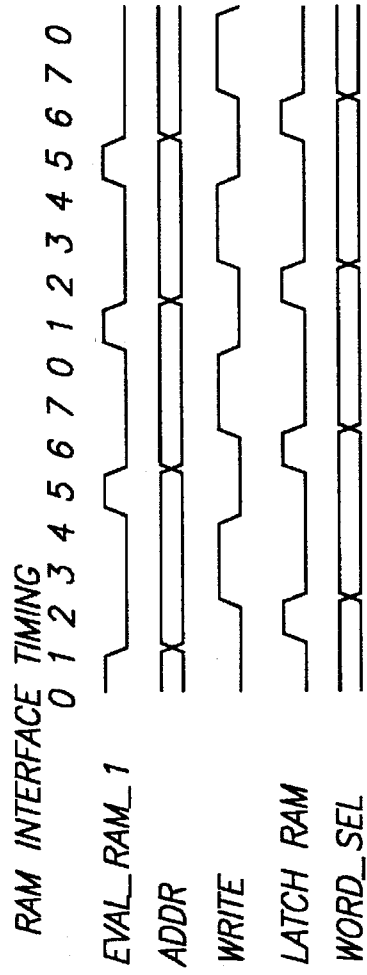
FIG. 6 is a timing diagram illustrating memory timing.

FIG. 6 shows the timing of the RAM interface signals. The address is applied one clock period before the write strobe is asserted and is held for one clock period after the write strobe is deasserted. When the signal eval_ram_1 is asserted, the address pipeline 80 of the Packet Router looks at the state of the current request's R/W and Valid bits and generates a new address for the next memory reference. If Valid is not asserted, the address loaded into a selected one of the address mux-flops 87 and 89 on the next clock cycle is zero. If R/W is asserted (=1), the packet's address is loaded (from the packet address register, not shown) into the write address mux-flop 87, and zero is loaded into the read address mux-flop 89. Similarly, when R/W=0, the read address mux-flop 89 is loaded with the packet's address and zero is loaded into the write address mux-flop 87.

Figure 3:
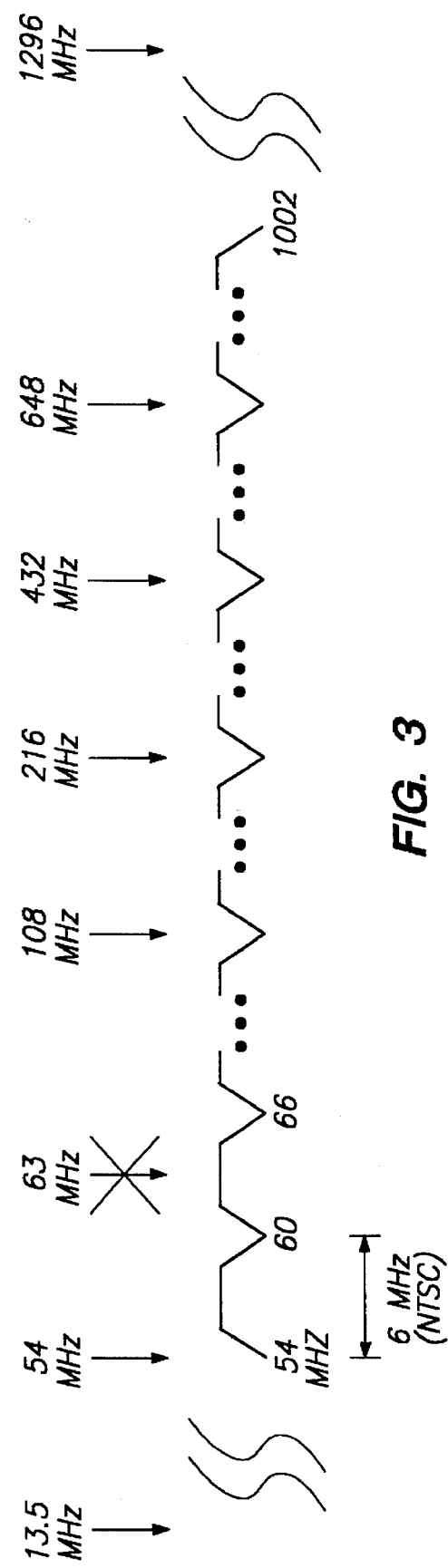
FIG. 3 is a diagram of a signal spectrum.

As described, the principal component of noise generated in operation of the memory is at 432 MHz. The effects of this noise component may be minimized by choosing other clock frequencies in the system in relation to this principal noise frequency. In particular, sampling frequencies are chosen to be integer divisors of this frequency. In a preferred embodiment, sampling frequencies for different ones of the I/O devices are chosen as follows: 432/2=216 MHz, 432/4=108 MHz, 432/8=54 MHz, and 432/32=13.5 MHz. Note that each of these frequencies falls either below or in between program channels as shown in FIG. 3.

The advantage of choosing sampling frequencies in the foregoing manner is that, in an A/D sampling operation, noise occurring at the sampling frequency or some multiple thereof is "aliased" to DC, making no AC contribution to the output signal. A DC bias can be readily removed from the signal (e.g., using a high-pass filter), whereas AC noise at a fundamental frequency and related harmonic frequencies is more problematic.

Figure 7:
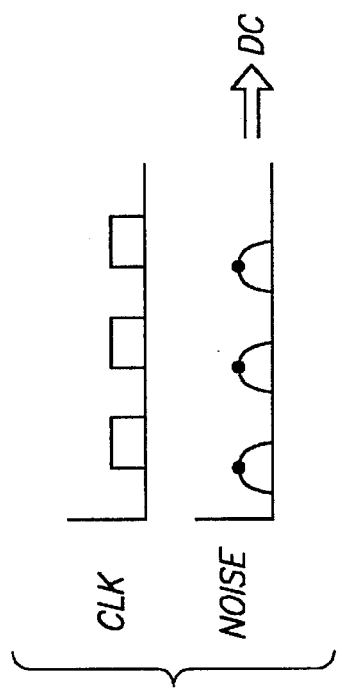
FIG. 7 is a waveform diagram illustrating the manner in which noise is aliased to DC in the course of an A-to-D sampling operation.

The manner in which noise at the sampling frequency or some multiple thereof is aliased to DC is illustrated in FIG. 7. In the upper portion of FIG. 7 is shown the waveform of the sampling clock of an A/D converter. Sampling takes place on the rising edge of the clock. In the bottom portion of FIG. 7 is shown a noise waveform having the same frequency as the sampling clock. Whatever the phase alignment of the sampling clock and the noise waveform, the noise waveform will be sampled at the same phase each sampling time such that the samples have the same magnitude. The result is a DC signal. Furthermore, if the noise frequency is doubled or tripled, or multiplied by an integer value, the same result will obtain. Therefore, since the noise generated by the memory 29 occurs at a frequency that is an integer multiple of each of the sampling frequencies, the noise will not introduce any AC artifacts into the sampled signal.

Figure 8:
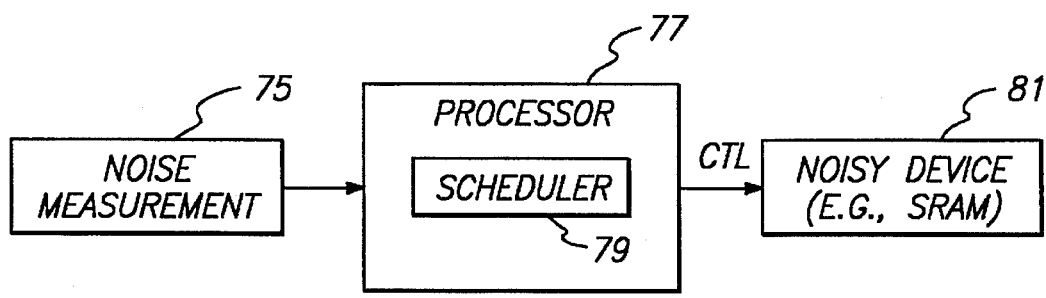
FIG. 8 is a block diagram of an adaptive, processor-controlled, noise reduction system.

The noise immunity previously described is made possible in large part by regularizing the operation of the memory 29. In the illustrated embodiment, operation of the memory is controlled by a hardware memory controller. In other embodiments, the operations to be controlled for purposes of focussing the noise generated into more favorable portions of the spectrum may be controlled by software. Therefore, another related implementation of the present invention is to structure system software code in such a way that hardware functions controlled by this code operate in a regular sequency, again focussing the noise within a narrow spectrum. An interactive mode of operation may be employed, whereby if noise interference occurs, algorithms that change the sequence or periodicity of digital functions operate to reduce it. Therefore, referring to FIG. 8, a noise or bit-error-rate measurement apparatus 75 input a noise measurement to a processor 77. The processor includes a software scheduler 79 that controls the synchrony of operation of one or more noisy devices 81, such as an SRAM. Software schedulers are well-known in the art.

Finally, the concept described applies not solely to mixed signal systems, used for illustration, but for any electrical system where internal or external interactions from noise energy become an issue. For example, a system may show improved EMC (electromagnetic compatibility) with the environment using these techniques.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A data processing apparatus in which switching noise generated by the apparatus is caused to have a predetermined periodicity, thereby allowing the effects of such noise to be mitigated, the apparatus comprising:

a data device;

control means including first means responsive to a signal from said data device for producing a first control pulse and second means for, without any signal from said data device, producing a second control pulse, said first and second control pulses being non-overlapping in time; and transaction processing means operatively connected to said data device via a data bus, said transaction processing means being responsive to said first control pulse for performing transaction processing in which valid data is exchanged with said data device, and being responsive to said second control pulse for performing transaction processing in which no valid data is exchanged with any data device;

wherein said control means produces one of said first control pulse and said second control pulse during each time interval in a sequence of regular, equal time intervals.

2. The apparatus of claim 1, wherein said transaction processing means is a memory and said control means is a memory controller.

3. The apparatus of claim 2, wherein said memory includes a location designated as a dummy location, contents of which are involved in said transaction processing in which no valid data is exchanged with any data device.

4. The apparatus of claim 3, wherein said memory controller includes means responsive to said second control pulse for applying to said memory an address of said dummy location.

5. A method of causing switching noise generated in an electronic assembly to have a predetermined periodicity, thereby allowing the effects of such noise to be mitigated, said assembly including digital electronics, said digital electronics including transaction processing means responsive to requests from at least one data device to execute transactions, the method comprising the steps of:

at irregular time intervals, requesting the transaction processing means to execute first transactions in which valid data is exchanged with said data device; and during intermediate time intervals in which the transaction processing means has not been requested to execute said first transactions, executing dummy transactions in which no valid data is exchanged with any data device, said first transactions and said dummy transactions collectively occurring at regular, equal time intervals.

6. A method of causing switching noise generated in an electronic assembly to have a predetermined periodicity, thereby allowing the effects of such noise to be mitigated, said assembly including a semiconductor memory and at least one data device, the method comprising the steps of:

designating a location in said memory as a dummy location;

at irregular time intervals, performing first memory transactions involving locations other than said dummy location in which valid data is exchanged with said data device;

during intermediate time intervals when said first memory transactions are not being performed, performing second memory transactions involving said dummy location in which no valid data is exchanged with any data device, said first memory transactions and said second memory transactions collectively occurring at regular, equal time intervals.

* * * * *